(12) United States Patent
Bates

(10) Patent No.: US 6,423,106 B1
(45) Date of Patent: Jul. 23, 2002

(54) METHOD OF PRODUCING A THIN FILM BATTERY ANODE

(75) Inventor: John Bates, Marietta, GA (US)

(73) Assignee: Johnson Research & Development, Smyrna, GA (US)

( * ) Notice: Subject to any disclaimer, the term of this patent is extended or adjusted under 35 U.S.C. 154(b) by 0 days.

(21) Appl. No.: 09/543,280

(22) Filed: Apr. 5, 2000

(51) Int. Cl.$^7$ ................................................. H01M 6/00
(52) U.S. Cl. ................ 29/623.1; 29/623.5; 429/231.95; 429/218.1
(58) Field of Search .................. 429/231.9, 231.95, 429/218.1, 229, 233, 245; 29/623.1, 623.5, 623.3; 423/235, 239.1

(56) References Cited

U.S. PATENT DOCUMENTS

| | | | |
|---|---|---|---|
| 3,237,078 A | 2/1966 | Mallory | 320/17 |
| 3,393,355 A | 7/1968 | Whoriskey et al. | 320/18 |
| 4,303,877 A | 12/1981 | Meinhold | 320/18 |
| 4,614,905 A | 9/1986 | Petersson et al. | 320/18 |
| 4,654,281 A | 3/1987 | Anderman et al. | 429/209 |
| 4,719,401 A | 1/1988 | Altmejd | 320/13 |
| 5,270,635 A | 12/1993 | Hoffman et al. | 320/21 |
| 5,291,116 A | 3/1994 | Feldstein | 320/4 |
| 5,314,765 A * | 5/1994 | Bates | 429/194 |
| 5,336,573 A | 8/1994 | Zuckerbrod et al. | 429/252 |
| 5,338,625 A | 8/1994 | Bates et al. | 429/193 |
| 5,362,581 A | 11/1994 | Chang et al. | 429/249 |
| 5,387,857 A | 2/1995 | Honda et al. | 320/18 |
| 5,399,246 A * | 3/1995 | Joshi | 204/130 |
| 5,411,592 A | 5/1995 | Ovsbinsky et al. | 118/718 |
| 5,445,906 A | 8/1995 | Hobson et al. | 429/162 |
| 5,455,126 A | 10/1995 | Bates et al. | 429/127 |
| 5,512,147 A | 4/1996 | Bates et al. | 204/192.15 |
| 5,561,004 A | 10/1996 | Bates et al. | 429/162 |
| 5,567,210 A | 10/1996 | Bates et al. | 29/623.5 |
| 5,569,520 A | 10/1996 | Bates | 429/162 |
| 5,597,660 A | 1/1997 | Bates et al. | 429/191 |
| 5,612,152 A | 3/1997 | Bates | 429/152 |
| 5,654,084 A | 8/1997 | Egert | 428/215 |
| 5,778,515 A | 7/1998 | Menon | 28/623.4 |
| 5,783,928 A | 7/1998 | Okamura | 320/122 |
| 5,811,205 A | 9/1998 | Andrieu et al. | 429/137 |
| 5,821,733 A | 10/1998 | Turnbull | 320/116 |
| 5,919,587 A * | 7/1999 | Mukherjee et al. | 429/213 |

OTHER PUBLICATIONS

Journal of Power Sources, P. Fragnaud, R. Nagarajan, D.M. Schleich, D. Vujic, Thin–film cathodes for secondary lithium batteries, 1995.

Materials Research Society, The Preparation and Characterization of Lithium Cobalt Oxide Thin Films by LPCVD, 1996.

Journal of Power Sources, Thin film solid electrolytes and electrodes for rechargeable lithium–ion batteries, J. Schoonman, E.M. Kelder, 1997.

Solid State Ionics, Fabrication of LiCoO2 thin film cathodes for rechargeable lithium battery by electrostatic spray pyrolysis, C.H. Chen et al., 1995.

Journal of Materials Science, Unique porous LiCoO2 thin layers prepared by electrostatic spray deposition. C.H. Chen et al., 1996.

* cited by examiner

*Primary Examiner*—Stephen Kalafut
*Assistant Examiner*—R. Alejandro
(74) *Attorney, Agent, or Firm*—Baker, Donelson, Bearman, & Caldwell

(57) ABSTRACT

A method of producing a battery cell anode is described wherein the manufacturing process of the anode commences with a sputtering target with a composition of $Li_3Sn$. The target is sputtered in an argon-nitrogen ($Ar—N_2$) gas mixture, wherein the nitrogen gas is limited to within a range of 0.5%–15% of the total volume of gas. The sputtering of the target produces a $Sn:Li_3N$ anode layer.

5 Claims, No Drawings

METHOD OF PRODUCING A THIN FILM BATTERY ANODE

TECHNICAL FIELD

This invention relates to thin film battery construction, and more particularly to a method of producing the components of a thin film battery.

BACKGROUND OF THE INVENTION

Lithium-ion batteries have existed for many years. These batteries have high energy and power densities as well as the capability of being cycled thousands of times. The active battery components are a lithium intercalation cathode, e.g. $V_2O_5$, $LiMn_2O_4$ or $LiCoO_2$, and a lithium metal anode separated by an electrolyte. It has been found the $LiCoO_2$ cathodes have the highest energy and power densities making them attractive as compact rechargeable power sources for application in a varies of electronic devices.

However, thin film lithium batteries cannot be integrated into electronic circuits using the solder reflow method as the temperature required for this process, 250° C.–290° C., is well above the melting point of lithium metal, 180° C. Recently thin film lithium-ion batteries have been developed that are based on inorganic oxynitride and nitride anodes such as silicon-tin oxynitride, tin nitride, or zinc nitride. These batteries can withstand solder reflow temperatures with no adverse effect on battery performance.

However, upon the initial charging of the lithiumion battery approximately one half of the lithium from the $LiCoO_2$ cathode is irreversibly lost to the anode because the oxygen and/or nitrogen in the anode reacts with the lithium to form $Li_2O$ and/or $Li_3N$ accompanied by the precipitation of silicon and/or tin. Subsequently cycling of the battery occurs through the remaining lithium found in the $Li_xSi$ and/or $Li_xSi$ alloys formed in the anode. For example, the reaction on initial charge of a cell with a tin nitride ($Sn_3N_4$) anode is:

$$252\ LiCoO_2 + 5Sn_3N_4 = 3\ Li_{22}Sn_5 + 20\ Li_3N + 252\ Li_{0.5}CoO_2$$

The anode consists of a lithium-tin alloy ($Li_{22}Sn_5$) in this instance dispersed throughout a solid matrix of $Li_3N$. After the initial charge, the following discharge-charge cycles occurs through the exchange of lithium between the $Li_{22}Sn_5$ in the anode and the $LiCoO_2$ in the cathode:

$$252\ Li_{0.5}CoO_2 + 3\ Li_{22}Sn_5 = 252\ Li_{0.76}O_2 + 15\ Sn$$

Accordingly, it is seen that a need remains for a method of producing a thin film battery with minimal capacity loss on the initial charge. It is to the provision of such therefore that the present invention is primarily directed.

SUMMARY OF THE INVENTION

In a preferred form of the invention a method of producing a battery cell anode comprises the steps of providing a $Li_xSn_y$ target and depositing the $Li_xSn_y$ target in an argon-nitrogen atmosphere to form a $Sn:Li_3N$ anode, the nitrogen being limited to between 0.5% and 15% of the total volume of the argon-nitrogen atmosphere.

DETAILED DESCRIPTION

Thin film batteries typically include components which have been built up onto a substrate. The battery includes a cathode, an electrolyte and an anode, wherein each component is provided by a film deposited in a predetermined fashion upon the substrate. The battery may also in include a packaging which provides a barrier against the penetration of air and water vapor.

The substrate underlying the battery may be comprised of glass, alumina or various semiconductor or polymer materials. To enable electrical power to be withdrawn, the battery typically includes two current collector films deposited upon the substrate. The electrolyte may be an amorphous lithium phosphorus oxynitride having the composition $Li_xPO_yN_z$.

To produce the anode in accordance with the present invention, the manufacturing process commences with a sputtering target with a composition of $Li_3Sn$. The target is sputtered in an argon-nitrogen (Ar—$N_2$) gas mixture, wherein the nitrogen gas is limited to within a range of 0.5%–15% of the total volume of gas. The sputtering of the target produces a $Sn:Li_3N$ anode layer according to the reaction:

$$2Li_3Sn + N_2 = 2Sn:Li_3N$$

The designation $2Sn:Li_3N$ denotes tin (Sn) dispersed within a matrix of $Li_3N$.

It should be understood that the $Sn:Li_3N$ anode eliminates the capacity loss on the initial charging of the battery cell since all of the nitrogen in the anode is already bound in the $Li_3N$ and all of the tin (Sn) required for the alloying with the lithium in the cathode is now available for cycling purposes. The composition of the deposited anode film depends on the relative affinities of Sn and Li for nitrogen and on the balancing of the partial pressure of $N_2$ with the sputtering rate.

It is critical to the invention that the atmosphere during the sputtering process limit the amount of available nitrogen to avoid the combining of nitrogen with the tin to form $Sn_3N_4$, and to promote the combination of the lithium with the nitrogen. As such, upon initial charging of the battery cell, the lithium within the cathode will not be lost due to its combination with nitrogen within the anode, and as such the lithium is used efficiently in the charging-discharging cycle process.

With the anode of this composition the cycling with can be represented by:

$$74LiCoO_2 + 5SnLi_3N = Li_{22}Sn:5Li_3N + 74Li_{0.5}CoO_2$$

In this equation $LiCoO_2$ represents the pre-charged cathode, the $SnLi_3N$ represents the pre-charged anode, the $Li_{22}Sn_5:5Li_3N$ represents the post-charged anode, and the $Li_{0.5}CoO_2$ represents the post-charged cathode.

It should be understood that the method of the present invention may also be used in connection with other lithium alloying elements, such as nickel, zinc, silicon or tinsilicon. It should also be understood that the sputtering process is equivalent to other methods of chemical and physical vapor deposition, i.e. reactive sputtering or reactive evaporation, such as e-beam evaporation, chemical vapor deposition. As such, the term deposition and depositing as used herein is meant to include all such methods.

While this invention has been described in detail with particular reference to the preferred embodiments thereof, it should be understood that many modifications, additions and deletions, in addition to those expressly recited, may be made thereto without departure from the spirit and scope of invention as set forth in the following claims.

What is claimed is:

1. A method of producing a battery cell anode comprising steps of:
   (a) providing a $Li_3Sn$ material;
   (b) depositing the $Li_3Sn$ material in an argon-nitrogen atmosphere to form a $Sn:Li_3N$ anode, the nitrogen being limited to between 0.5% and 15% of the total volume of the argon-nitrogen atmosphere.

2. A method of producing a battery cell anode comprising the steps of:
   (a) providing a $Li_3Sn$ sputtering target;
   (b) sputtering the $Li_3Sn$ target in an argon-nitrogen atmosphere to form an anode, the nitrogen being limited to between 0.5% and 15% of the total volume of the argon-nitrogen atmosphere.

3. The method of claim 2 wherein the lithium alloying elements are selected from the group consisting of tin, nickel, zinc and silicon.

4. The method of claim 3 wherein the element is tin and the formed anode is $Sn:Li_3N$.

5. A method of producing a battery cell anode comprising the steps of:
   (a) providing a sputtering target having lithium combined with zinc;
   (b) sputtering the target in an argon-nitrogen atmosphere to form an anode having zinc within a lithium-nitrogen matrix wherein the formed anode is $Zn:Li_3N$, the nitrogen being limited to between 0.5% and 15% of the total volume of the argon-nitrogen atmosphere.

* * * * *